United States Patent
Pauws et al.

(10) Patent No.: US 7,880,077 B2
(45) Date of Patent: Feb. 1, 2011

(54) METHOD AND SYSTEM FOR REFINING A MEDIA PROGRAM ITEM BY ITEM

(75) Inventors: Steffen C. Pauws, Eindhoven (NL); Fabio F. Vignoli, Veldhoven (NL)

(73) Assignee: Pace Micro Technology PLC (GB)

( * ) Notice: Subject to any disclaimer, the term of this patent is extended or adjusted under 35 U.S.C. 154(b) by 763 days.

(21) Appl. No.: 11/718,397

(22) PCT Filed: Nov. 1, 2005

(86) PCT No.: PCT/IB2005/053559

§ 371 (c)(1),
(2), (4) Date: May 2, 2007

(87) PCT Pub. No.: WO2006/048819

PCT Pub. Date: May 11, 2006

(65) Prior Publication Data

US 2008/0133034 A1    Jun. 5, 2008

Related U.S. Application Data

(60) Provisional application No. 60/624,889, filed on Nov. 4, 2004.

(51) Int. Cl.
*G10H 1/00* (2006.01)
*G10H 1/18* (2006.01)
*G10H 7/00* (2006.01)

(52) U.S. Cl. .......................................... 84/615; 707/749
(58) Field of Classification Search .................. 84/615; 707/728, 748, 749
See application file for complete search history.

(56) References Cited

U.S. PATENT DOCUMENTS

2003/0221541 A1    12/2003    Platt

FOREIGN PATENT DOCUMENTS

EP    1557836 A2    7/2005

*Primary Examiner*—Jeffrey Donels
(74) *Attorney, Agent, or Firm*—McKee, Voorhees & Sease, P.L.C.

(57) ABSTRACT

A media system interface (200) includes a display (210) that provides a play list (300, 400) of media items to be played, such as songs or broadcast television or radio programs. A user input device (220) such as buttons on the interface allows the user to highlight a selected media item (T4) which is not desired, and to request that the media item be replaced by an alternative media item (T4-A1). The user may further indicate if the undesired item should be replaced by a similar or dissimilar item. The alternative media item is automatically selected, such as based on user preference data (145), and the list is displayed in an updated form (500, 600) with the alternative media item. A layout of the play list is adjusted to accommodate the alternative media item. The display may be provided, e.g., on a portable media player or a remote control to a home media system.

20 Claims, 4 Drawing Sheets

|  | PLAYLIST (PL1) (47:25) (TRT1) | | — 310 |
|---|---|---|---|
| ■ | 1. (T1) (A1) | El Cuarto De Tula<br>Ry Cooder | 7:25 (RT1) |
| ■ | 2. (T2) (A2) | Head Over Feet<br>Alanis Morissette | 4:27 (RT2) |
| ■ | 3. (T3) (A3) | Can't Stop This Thing We...<br>Bryan Adams | 4:28 (RT3) |
| ■ | 4. (T4) (A4) | Summer of '69<br>Bryan Adams | 3:34 (RT4) |
| ■ | 5. (T5) (A5) | Candela<br>Ry Cooder | 5:27 (RT5) |

|  | PLAYLIST (PL1) (47:25) (TRT1) | | — 310 |
|---|---|---|---|
| ■ | 1. (T1) (A1) | El Cuarto De Tula<br>Ry Cooder | 7:25 (RT1) |
| ■ | 2. (T2) (A2) | Head Over Feet<br>Alanis Morissette | 4:27 (RT2) |
| ■ | 3. (T3) (A3) | Can't Stop This Thing We...<br>Bryan Adams | 4:28 (RT3) |
| ▶ | 4. (T4) (A4) | Summer of '69<br>Bryan Adams | 3:34 (RT4) |
| ■ | 5. (T5) (A5) | Candela<br>Ry Cooder | 5:27 (RT5) |

```
┌─────────────────────────────────────────────────┐ ─500
│        PLAYLIST (PL2) (48:38) (TRT2)          ├─310
│                                                 │
│  ■  1. (T1)    El Cuarto De Tula    7:25 (RT1) ├─320
│        (A1)    Ry Cooder                        │
│  ■  2. (T2)    Head Over Feet       4:27 (RT2) │
│        (A2)    Alanis Morissette                │
│  ■  3. (T3)    Can't Stop This Thing We...  4:28 (RT3) │
│ 330─   (A3)    Bryan Adams                      │
│  ▶  4. (T4-A1) Full Circle          5:00 (RT4- │
│        (A4-A1) Aerosmith                  A1)   │
│  ■  5. (T5)    Candela              5:27 (RT5) │
│        (A5)    Ry Cooder                        │
│ 325↗            • • •                  • • •    │
└─────────────────────────────────────────────────┘
```

FIG. 6

```
┌─────────────────────────────────────────────────┐ ─600
│        PLAYLIST (PL2) (48:38) (TRT2)          ├─310
│                                                 │
│  ■  1. (T1)    El Cuarto De Tula    7:25 (RT1) ├─320
│        (A1)    Ry Cooder                        │
│  ■  2. (T2)    Head Over Feet       4:27 (RT2) │
│        (A2)    Alanis Morissette                │
│  ■  3. (T3)    Can't Stop This Thing We...  4:28 (RT3) │
│ 330─   (A3)    Bryan Adams                      │
│  ▶  4. (T4-A1) Full Circle          5:00 (RT4- │
│        (A4-A1) Aerosmith                  A1)   │
│  ■  5. (T5)    Candela              5:27 (RT5) │
│        (A5)    Ry Cooder                        │
│ 325↗            • • •                  • • •    │
└─────────────────────────────────────────────────┘
```

METHOD AND SYSTEM FOR REFINING A MEDIA PROGRAM ITEM BY ITEM

The invention relates generally to a method for use by a media system in displaying a media program, such as a music play list, list of slides for a slide show, or list of broadcast shows and, more particularly, to a method that allow the user to edit the list by selecting undesired items on the list to be replaced by new items. A media system that implements the method is also provided.

Various types of media systems are now available to consumers and other users. For example, portable digital music players, such as MP3 players, allow the storage of numerous songs in digital format in a small handheld device. Moreover, home entertainment systems are also media systems that allow the user to access content via cable and satellite television networks, computer networks such as the Internet, and via local storage such as movies stored on digital versatile disks (DVDs). For example, electronic program guides allow the user to select from available television broadcast programs. Broadcast of radio programs, such as talk shows and music, via satellite to car and home receivers in a digital format is also gaining in popularity.

For instance, the Nexperia™ Personal Media Player from Philips Corp. provides a reference design for mobile device manufacturers. It offers high-resolution video recording and playback as well as connectivity to PCs and home entertainment systems. Personal media devices based on the design will allow consumers to connect, wired or wirelessly, to their PCs and home entertainment appliances to record and store high-quality digital audio and video and then watch movies, listen to music and view photos on the move. The media player offers compatibility with a variety of audio and video standards, including MP3, AAC, Dolby® Digital, MPEG-2, MPEG-4, and DivX®.

Due to the proliferation of available content, the current media systems typically assist the user in making selections among content items (e.g., songs, or television or radio programs) by providing recommendations and generating programs based on user preference data. For example, user preferences may be developed by providing a user interface that asks a user to identify the type of music, for instance, he or she is interested in. Or, the media system may employ logic that tracks a user's selections over time to learn what type of content he or she is interested in. The media system can then recommend content in the form of a play list of items. For instance, a portable media player may automatically generate a play list of songs, and display information such as the title and artist on a display of the media player.

However, the user has not had a satisfactory ability to refine such play lists, such as by removing individual items that are not desired.

The present invention addresses the above and other issues by providing a method and system for enabling a user to edit a list of items in a media program to remove undesired items, while having alternative items automatically suggested in place of the removed items. User benefits include the fact that only limited cognitive resources are needed since only one item changes at a time, in one possible approach, and the user can directly see whether or not the media program as a whole improves. Other benefits include the fact that only limited screen real estate is required, and the system can directly learn from the interaction with the user by an induction mechanism.

In a particular aspect of the invention, a method for enabling a user to edit a media program includes: (a) displaying a list of a plurality of media items that are to be, played on a media system, one after the other; and (b) performing at least one update iteration, wherein each update iteration comprises: (i) receiving a user command identifying at least one of the plurality of media items which the user desires to remove from the list; (ii) automatically selecting at least one alternative media item to replace the at least one of the plurality of media items, responsive to the user command; and (iii) displaying the list in an updated form in which the at least one of the plurality of media items is replaced by the at least one alternative media item.

A corresponding media system apparatus and program storage device are also provided.

In the drawings:

FIG. 3 illustrates a play list provided on a display of a media system, according to the invention;

FIG. 4 illustrates the play list of FIG. 3 where a user has selected an item to be replaced, according to the invention;

FIG. 5 illustrates a new play list, based on the play list of FIG. 3, where an alternative item is provided in place of a deleted item, and where the new play list has not yet been accepted by the user, according to the invention;

FIG. 6 illustrates the new play list of FIG. 5 after it has been accepted by the user, according to the invention.

In all the Figures, corresponding parts are referenced by the same reference numerals.

The present invention can be used in any type of media system that automatically generates a play list of media items which are to be played by the system, and that has a user interface for receiving commands from the user identifying which of the media items are undesired Examples of media systems include hard disk device (HDD) music players, set-top boxes, home media services, personal computers, and the like. The play list generally attempts to provide a list of media items (e.g., songs, TV programs) that are interrelated. The songs may refer to 'similar' artists or genres or may make use of user preferences that are stored by the media system. For play lists that can access a library of content such as songs, there is generally no constraint regarding the order in which the songs are played. Such a play list may be created for a particular purpose, such as "party songs", "exercise songs", "driving songs", and so forth. However, for play lists of broadcast content such as television or radio programs, there is generally a constraint that the programs must be played during the period in which they are broadcast. For instance, TV programs are typically scheduled for broadcast over specific time periods (e.g., half-hour or hour periods) in a specified sequence. Electronic program guides (EPG) are commonly used to determine which programs are scheduled for broadcast. A play list thus can be created for an evening's worth of TV viewing, for instance, by selecting programs from the EPG. Many media system also provide for recording of the broadcast programs for subsequent play back at any time. Moreover, it is also possible to create a play list as a personal viewing schedule of programs/shows that is largely independent of the broadcast schedule by time-shifting and intermixing live broadcast content with stored (personal) video/audio content.

Figure 1:
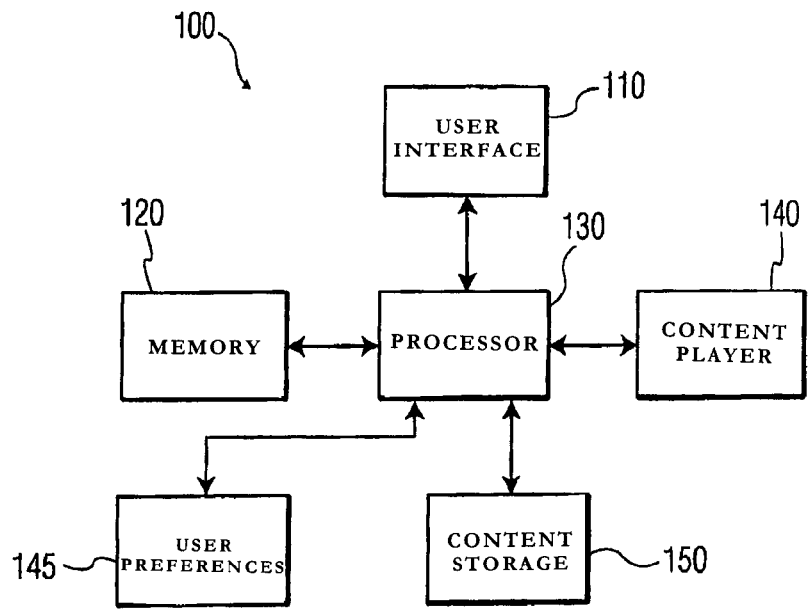
FIG. 1 illustrates a block diagram of a media system, according to the invention.

FIG. 1 illustrates a block diagram of an example media system. In FIG. 1, block 110 reads "user interface", block 120 reads "memory", block 130 reads "processor", block 140 reads "content player", block 145 reads "user preferences", and block 150 reads "content storage". The media system 100 includes a processor 130 and a memory 120. The memory 120 may store instructions, such as software, micro-code or firmware, which are executed by the processor 130 to achieve the functionality described herein. The memory 120 may thus be considered a program storage device. Such a program storage device can be built into a media system such as a portable media player, e.g., an MP3 player. Or, the program storage device can be a removable media, such as a CDROM or portable USB flash memory from which the software is loaded for use by a personal computer, e.g., to run a slide show or other multi media presentation for a business meeting, for example. The slide show can also be in the form of a photo album of digital photos. The user preferences block 145 represents user preference data that is maintained by the media system for one or more users. Content storage 150 represents a storage resource for storing content, including audio content (e.g., songs, lectures), video content (e.g., digital photos) and audio/video content (e.g., movies). The content storage 150 can be a hard disk drive, flash memory, or any other memory resource. A content player 140 may be an audio and/or video player that processes the content from the content storage 150, (e.g., by performing decompression and decoding, for example) to provide an appropriate output signal, such as to a display or audio amplifier. A user interface 110 may provide a display, e.g., an LCD screen, or possibly a voice/audio interface, that allows a user to enter commands.

Figure 2:
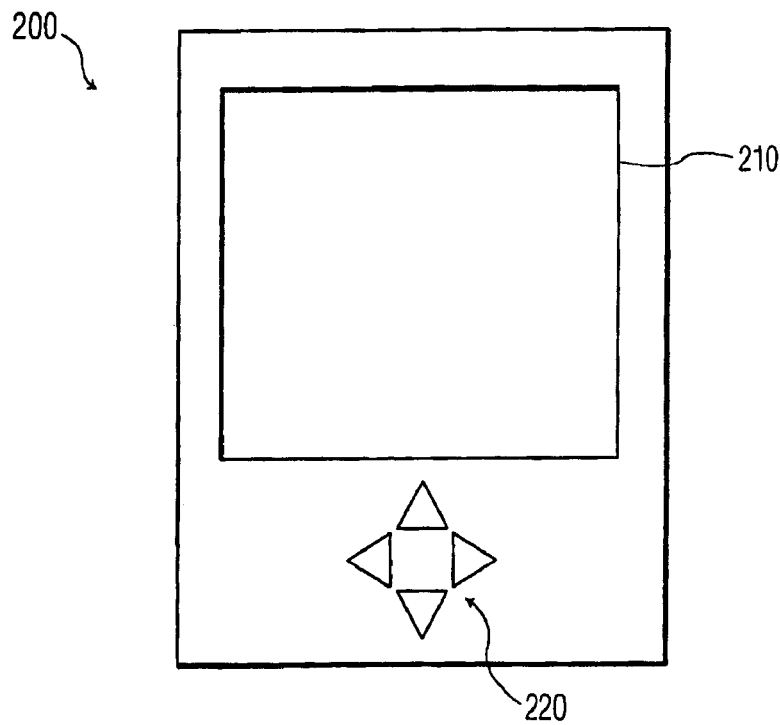
FIG. 2 illustrates an example media system display for displaying a play list, according to the invention.

FIG. 2 illustrates an example media system interface 200 with a display 210 for displaying a play list. In one possibility, the media system interface 200 is a self-contained media system such as a portable media player. It is also possible for the media system interface 200 to be provided in a device such as a handheld remote control that is used to communicate with other components in a home media system. For example, the display 210 may be in a TV remote control for providing a play list of TV programs. Additional buttons may be provided for controlling the TV, or the buttons may be generated on the display 210 as touch screen buttons. In another example, the media system interface 200 is a remote control for a CD player, and the display 210 provides a play list of songs available from a CD library. In another example, the media system interface 200 is part of a digital camera, and the display 210 provides a play list of images stored in the camera, optionally with preview images. Various other possibilities will be apparent to those skilled in the art. The media system interface 200 includes an input device such as arrow-shaped buttons 220 that allow the user to edit a play list, as discussed further below. For example, the user may press the upward pointing button to navigate upwards in a list of media items on the display 210, or press the downward pointing button to navigate downwards in the list of media items. The right and left pointing buttons, respectively, may allow the user to remove a media item in the play list, and to indicate that a revised play list is acceptable. The particular arrangement of buttons shown is an example only, as other arrangements are possible. Other interface mechanisms such as voice/audio interface can also be used. Or, the display 210 may be a touch screen that allows a user to touch a media item to select it, and to touch another part of the screen such as a "remove" button to have the item removed.

FIG. 3 illustrates an example play list 300 provided on the display 210. The play list includes a region 310, which indicates that a first play list (PL1) is displayed, and which provides the total run time (TRT1) of the first play list, in hours and minutes. A second region 320 of the play list 320 includes a number of media items, such as songs. As an example, five songs are displayed in a format that includes the title of the song (T1, T2, T3, T4 and T5), the artist (A1, A2, A3, A4 and A5, respectively), and the run time (RT1, RT2, RT3, RT4 and RT5, respectively). Generally, a list can include any number of items, e.g., one or more. In particular, media item 1 is "El Cuarto De Tula" (T1), by "Ry Cooder" (A1), media item 2 is "Head Over Feet" (T2), by "Alanis Morissette" (A2), media item 3 is "Can't Stop This Thing We . . . " (T3), by "Bryan Adams" (A3), media item 4 is "Summer of '69" (T4), by "Bryan Adams" (A4), and media item 5 is "Candela" (T5), by "Ry Cooder" (A5). Note that five media items are provided as an example only. Note also that the user may scroll on the display 210, e.g., up or down, to display additional media items. Scrolling left and right may also be provided where appropriate.

As mentioned, the play list can be automatically generated based on user preferences that indicate the likes and dislikes of the user. This information can be obtained directly from inputs made by the user, e.g., in response to a request to identify favorite genres or artists, or the information can be learned over time based on choices made by the user. Techniques for obtaining such user profile information are known to those skilled in the art. Also in the second display region are icons 325 for each media item.

FIG. 4 illustrates the play list of FIG. 3 where a user has selected an item to be replaced. Once the first play list 300 is displayed, the user can review the media items to determine if any are not desired. If a media item is not desired, the user can manipulate the buttons 220, for instance, to identify the undesired item. For example, the user may scroll down by pressing the down button until the fourth media item is reached. Each media item may be highlighted in turn, one at a time, when it is selected by the user using the input device of the media system. For example, the first media item may be selected, then the second, then the third, and then the fourth. The icons 325 may change to have a different appearance, such as a different shape, when the associated media item is selected. In the example shown, the icon 330 in the play list 400 changes from a square to an arrow to highlight, e.g., draw attention to, the associated media item. Various other approaches may be used to visually identify a media item. For example, the entire media item entry (e.g., title and artist) may appear highlighted with a different color as it is selected by the user. The user can then enter a command to request that the selected media item be replaced by an alternative media item. The user can manipulate the buttons 220 to do this, for example. Once the command is entered, the processor 130 executes instructions for automatically generating an alternative media item that should be desirable to the user, and the play list is displayed in an updated form that includes the alternative media item in place of the removed item, as shown by the play list 500 of FIG. 5.

Note that a layout of the list can be adjusted to accommodate the alternative media item. For instance, an alternative media item with two lines of text for the title may replace a media item with one line, in which case the media items below the alternative media item are moved down by one line to provide the necessary display space for the alternative media item. For a display that shows the broadcast times of programs, such as in a grid where the horizontal extent of a grid space corresponds to the broadcast duration, this timing information may be adjusted as well. For instance, a one hour long program may be replaced by two, half hour long programs, in which case a single grid space that corresponds to a one hour duration is replaced by two grid spaces that each correspond to a half-hour duration. Similarly, two, half-hour long programs can be replaced by a one hour long program.

Furthermore, it is possible to enable the user to select more than one media item at a time to be replaced in a single update action.

FIG. 5 illustrates a new play list 500, based on the play list of FIG. 3, where an alternative item is provided in place of a deleted item, and where the new play list has not yet been accepted by the user. In particular, the play list region 310 indicates that the current play list is a second play list (PL2). This number or iteration of the play list need not be provided, as it may not be of interest to the casual user. The new total run time for the second play list (TRT2) is also provided. The fourth media item is now the alternative media item, namely "Full Circle", by "Aerosmith". The associated run time (RT4-A1) is also provided. The suffix notation "A1" in the title (T4-A1), author (A4-A1), and run time (RT4-A1) indicates that the information is provided for a first alternative media item. Again, this type of notation is not required to be displayed, but merely assists in understanding here. Once the second play list 500 is displayed, the user can review the alternative media items, as well as the media items provided in the first play list 300, to determine if any are not desired. The user can manipulate the buttons 220 to indicate whether the alternative media item is acceptable. If it is not, the user enters another command to request another alternative media item, and the process as described above is repeated in another iteration. The process can be repeated any number of times. If the alternative media item is acceptable, but the user desires to remove other media items from the play list, the user can proceed as outlined to select another undesired item, and provide a command for another alternative media item to be generated.

If the play list 500, including the alternative media item, is acceptable, the user can manipulate the buttons 220 to indicate this. Or, a timer may be run such that the play list is deemed acceptable if the user provides no input within a set amount of time. Once, the play list is deemed acceptable, it is displayed in an updated form such that none of the media items are highlighted. This is shown in the play list 600, where the icon 330 has returned to the original form, indicating that the fourth media item is not selected. FIG. 6 illustrates the new play list 600 of FIG. 5 after it has been accepted by the user.

Figure 7:
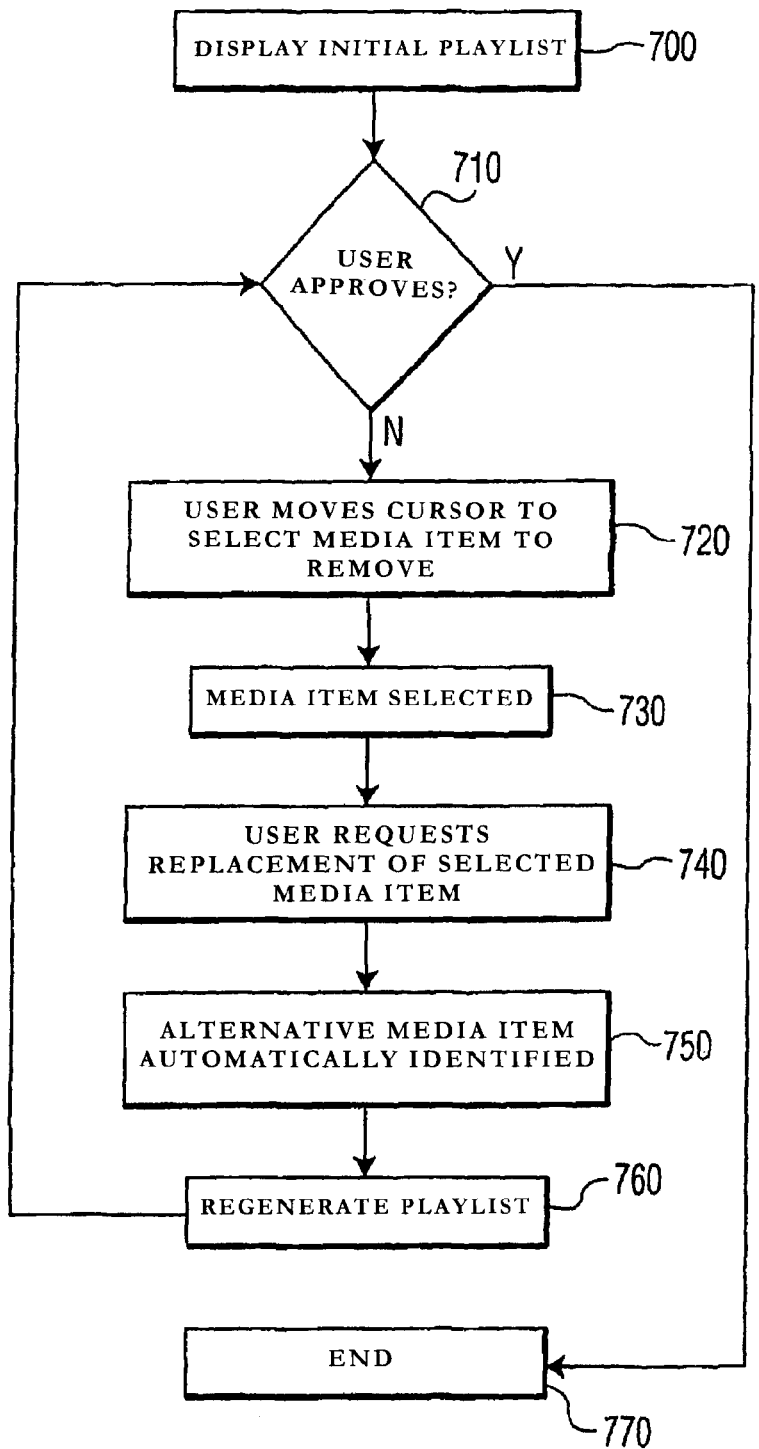
FIG. 7 illustrates a method for editing a media program, according to the invention.

FIG. 7 illustrates a method for editing a media program. Block 700 reads "Display initial play list." Block 710 reads "User approves". Block 720 reads "User moves cursor to select media item to remove." Block 730 reads "Media item selected". Block 740 reads "User requests replacement of selected media item." Block 750 reads "Alternative media item automatically identified." Block 760 reads "Regenerate play list." Block 770 reads "end."

As indicated, an initial play list is displayed (block 700). For example, this may be done automatically when the user powers on the media system, or based on a command entered by the user. It is also possible for the user to return to a play list that was previously playing. If the user approves of the play list (block 710), the edit process ends (block 770). At this time, the media system may initiate playing of the media items on the play list in order. Note that it is also possible for the user to edit a play list while the media items are being played. In this case, a media item that has not yet been played can be replaced. If the user does not approve of the play list, the user performs at least one update iteration of the play list. Such an iteration involves selecting a media item to be replaced, such as by moving a cursor to highlight the item (block 720). Once the media item is selected (block 730), the user requests that the item be replaced (block 740). Note that the user can affirmatively enter a command, or a timer may be used such that a command to replace is implied when the item is selected for a set amount of time. Responsive to the command, the alternative media item is automatically identified (block 750), and the play list is regenerated with it (block 760).

Generally, user acceptance of a play list can be realized by an explicit user command (or by a timer set, as mentioned). In one possible approach, user acceptance is simply left implicit. That is, if the user does not start a new update action, it is assumed that he or she will likely not pursue editing the play list. However, an explicit acceptance command is helpful if the user wants to undo an update action. In other words, it is possible to provide the capability for the user to undo or reverse a command to remove an item. In this case, a user command is received for canceling the removal of an identified media item, and the list is displayed in a form in which the identified media item, is displayed on the list again in place of the alternative media item. Essentially, the prior version of the list is displayed. The process can be repeated to return to an earlier version of the list, if desired.

Moreover, it is also possible to provide the capability for the user to select two or more items to replace with a single update action. In this case, the user command identifies at least two of the media items which the user desires to remove from the list, two or more alternative media items are automatically selected to replace the at least two identified media items, responsive to the user command, and the list is displayed in an updated form in which the at least two identified media items are replaced by the alternative media items.

As mentioned, the generation of media items by the media system can take into account user preferences, the characteristics of the selected song to be replaced and a broadcast schedule time, if applicable. That is, a program that is scheduled to be broadcast in a given time period should be replaced by an alternative program in the same time period. Furthermore, the user can provide a command indicating whether the media item that the user desires to remove from the list should be replaced by a similar or dissimilar item. The user input device 220 may be used for this purpose, for instance. The media system can use this information in identifying the alternative media item. For example, if the undesired selection is by a given artist, and the user enters a command to have a similar item, another song by the same artist, or by another artist in the same genre, may be identified as the alternative media item. If the user enters a command for a dissimilar item, a media item from a different genre may be identified as the alternative media item. If the user approves of the new play list (block 710), the play list edit process ends. If the user does not approve, the user performs another update iteration.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but should be construed to cover all modifications that may fall within the scope of the appended claims.

The invention claimed is:

1. A method for enabling a user to edit a media program, comprising:

(a) displaying a list of a plurality of media items that are to be played on a media system, one after the other; and (b) performing at least one update iteration, wherein each update iteration comprises:

(i) receiving a user command identifying at least one of the plurality of media items which should be replaced by a similar or dissimilar item;

(ii) automatically selecting at least one alternative media item to replace the at least one of the plurality of media items responsive to the user command identifying which of the at least one of the plurality of media items should be replaced by a similar or dissimilar item; and (iii) displaying the list in an updated form in which the at least one of the plurality of media items is replaced by the at least one alternative media item.

2. The method of claim 1; further comprising:

performing a plurality of update iterations, responsive to successive user commands, until the user provides a command indicating that the list in the updated form is acceptable.

3. The method of claim 1, further comprising:

initiating playing of the media items on the list when the user provides a command indicating that the list in the updated form is acceptable.

4. The method of claim 1, wherein, for at least one of the update iterations:

the automatically selecting the at least one alternative media item is responsive to user preferences learned by the media system.

5. The method of claim 1, further comprising, for at least one of the update iterations:

highlighting media items identified by the user.

6. The method of claim 1, further comprising, for at least one of the update iterations:

storing user preference data, responsive to the user command, for use in the automatically selecting the at least one alternative media item.

7. The method of claim 1, wherein, for at least one of the update iterations:

the displaying the list in an updated form comprises adjusting a layout of the list to accommodate the at least one alternative media item.

8. The method of claim 1, wherein:

the media program comprises a musical play list.

9. The method of claim 1, wherein:

the list of media items comprises a list of broadcast shows and their broadcast times; and the at least one alternative media item has a broadcast time that is compatible with a broadcast time of the at least one of the plurality of media items.

10. The method of claim 9, wherein:

the shows comprise television shows.

11. The method of claim 9, wherein:

the shows comprise radio shows.

12. The method of claim 1, wherein:

the list of media items comprises a list of slides for a slide show.

13. The method of claim 1, wherein, for at least one of the update iterations:

the user command identifies at least two of the media items which the user desires to remove from the list;

the at least one alternative media item is automatically selected to replace the at least two identified media items, responsive to the user command; and the list is displayed in an updated form in which the at least two identified media items are replaced by the at least one alternative media item.

14. The method of claim 1, further comprising:

receiving a user command for canceling the removal of the at least one of the plurality of media items;

displaying the list in a form in which the at least one of the plurality of media items is displayed on the list in place of the at least one alternative media item.

15. The method of claim 1, wherein:

the list of media items comprises Ii list of both broadcast programs and stored content.

16. An apparatus for enabling a user to edit a media program, comprising:

(a) a display for displaying a list of a plurality of media items that are to be played on a media system, one after the other;

(b) an input device for receiving, user commands; and (c) means for performing at least one update iteration, wherein each update iteration comprises:

(i) receiving, via the input device, a user command identifying at least one of the plurality of media items which should be replaced by a similar or dissimilar item;

(ii) automatically selecting at least one alternative media item to replace the at least one of the plurality of media items, responsive to the user command identifying which of the at least one of the plurality of media items should be replaced by a similar or dissimilar item; and (iii) displaying the list in an updated form on the display in which the at least one of the plurality of media items is replaced by the at least one alternative media item.

17. The apparatus of claim 16, wherein:

the display highlights media items on identified by the user.

18. The apparatus of claim 16, wherein:

the display is provided on a portable media device.

19. The apparatus of claim 16, wherein:

the display is provided on a remote control to a home media system.

20. At least one program storage device tangibly embodying instructions executable by at least one processor to perform a method for enabling a user to edit a media program, the method comprising:

(a) displaying a list of a plurality of media items that are to be played on a media system, one after the other; and (b) performing at least one update iteration, wherein each update iteration comprises:

(i) receiving a user command identifying at least one of the plurality of media items which should be replaced by a similar or dissimilar item;

(ii) automatically selecting at least one alternative media item to replace the at least one of the plurality of media items, responsive to the user command identifying which of the at least one of the plurality of media items should be replaced by a similar or dissimilar item; and (iii) displaying the list in an updated form in which the at least one of the plurality of media items is replaced by the at least one alternative media item.

* * * * *